US009938023B2

(12) United States Patent
Clagett et al.

(10) Patent No.: US 9,938,023 B2
(45) Date of Patent: Apr. 10, 2018

(54) SYSTEM AND METHOD FOR AN INTEGRATED SATELLITE PLATFORM

(71) Applicant: The United States of America as represented by the Administrator of the National Aeronautics and Space Administration, Washington, DC (US)

(72) Inventors: Charles E. Clagett, Accokeek, MD (US); Luis H. Santos Soto, Greenbackville, VA (US); Scott V. Hesh, Greenbackville, MD (US); Scott R. Starin, Washington, DC (US); Salman I. Sheikh, Silver Spring, MD (US); Michael Hesse, Annapolis, MD (US); Nikolaos Paschalidis, Silver Spring, MD (US); Michael A. Johnson, Columbia, MD (US); Aprille J. Ericsson, Washington, DC (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 390 days.

(21) Appl. No.: 14/850,708

(22) Filed: Sep. 10, 2015

(65) Prior Publication Data
US 2017/0073087 A1    Mar. 16, 2017

(51) Int. Cl.
*B64G 1/10* (2006.01)
*B64G 1/22* (2006.01)
*B64G 1/66* (2006.01)
*B64G 1/44* (2006.01)
*H01J 49/26* (2006.01)

(52) U.S. Cl.
CPC ........... *B64G 1/1021* (2013.01); *B64G 1/222* (2013.01); *B64G 1/44* (2013.01); *B64G 1/66* (2013.01); *H01J 49/26* (2013.01)

(58) Field of Classification Search
CPC .. B64G 1/44; B64G 1/66; B64G 1/222; H01J 49/26
USPC ............................................ 244/172.6, 172.7
See application file for complete search history.

*Primary Examiner* — Brian M O'Hara
*Assistant Examiner* — Keith L Dixon
(74) *Attorney, Agent, or Firm* — Heather Goo; Bryan A. Geurts; Mark P. Dvorscak

(57) ABSTRACT

A system, method, and computer-readable storage devices for a 6U CubeSat with a magnetometer boom. The example 6U CubeSat can include an on-board computing device connected to an electrical power system, wherein the electrical power system receives power from at least one of a battery and at least one solar panel, a first fluxgate sensor attached to an extendable boom, a release mechanism for extending the extendable boom, at least one second fluxgate sensor fixed within the satellite, an ion neutral mass spectrometer, and a relativistic electron/proton telescope. The on-board computing device can receive data from the first fluxgate sensor, the at least one second fluxgate sensor, the ion neutral mass spectrometer, and the relativistic electron/proton telescope via the bus, and can then process the data via an algorithm to deduce a geophysical signal.

10 Claims, 6 Drawing Sheets

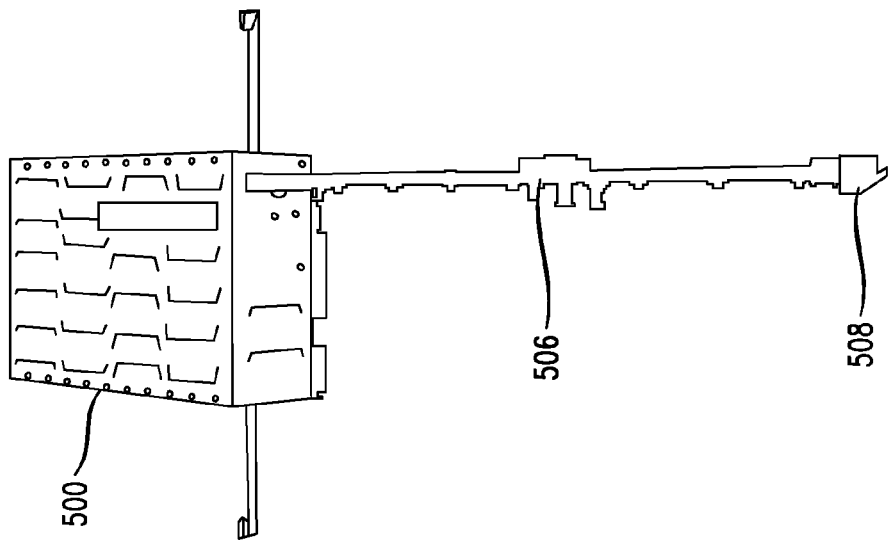
FIG. 5C
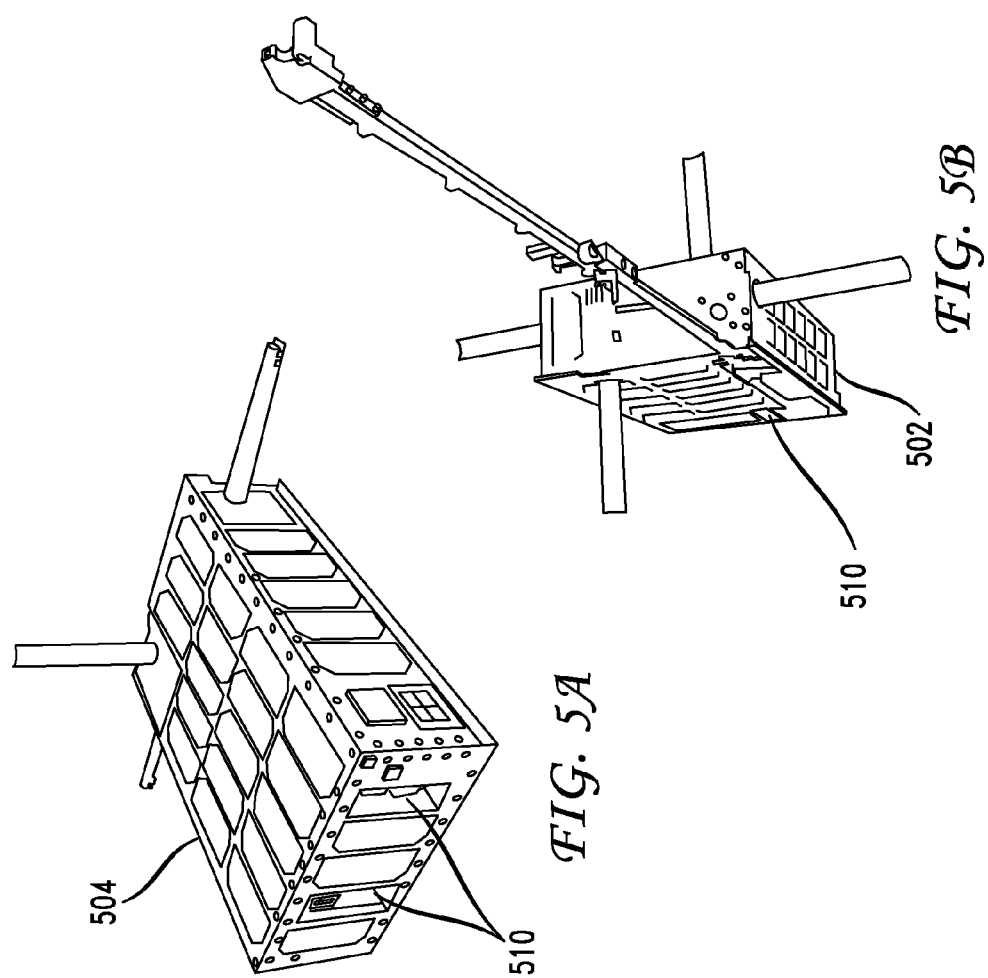
FIG. 5B
FIG. 5A

SYSTEM AND METHOD FOR AN INTEGRATED SATELLITE PLATFORM

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

BACKGROUND

1. Technical Field

The present disclosure relates to satellite technology, and more specifically, to an integrated platform for multiple types of sensors and devices in a small form factor satellite.

2. Introduction

CubeSats, short for cube satellites, have demonstrated exceptional potential for low-cost science platforms in space. To-date, CubeSat buses employed for research have been primarily based on the proven 3U (30×10×10 cm) standard, while mostly successful, limits instrument accommodation. Payloads are constrained primarily due to limited spacecraft resources such as power and volume. Science instruments can benefit from added capabilities provided by a 6U CubeSat (30 cm×20 cm×10 cm). A viable 6U bus would enable a greater range of Heliophysics science applications, and address the Decadal Surveys focus on both smaller platforms and constellations of smaller platforms. Unfortunately, no flight-proven 6U bus is in existence, even for applications within the Low Cost Access to Space (LCAS) program. Therefore, the provision of a viable and cost-effective 6U platform is an important step to achieve the Decadal Surveys goal of small, capable science platforms. Further, the 6U standard opens many possibilities, but at the same time introduces multiple obstacles to be overcome.

BRIEF DESCRIPTION OF THE DRAWINGS

FIGS. 5A, 5B, and 5C illustrate the example 6U satellite of FIG. 2 with the magnetometer boom extended.

DETAILED DESCRIPTION

Figure 1:
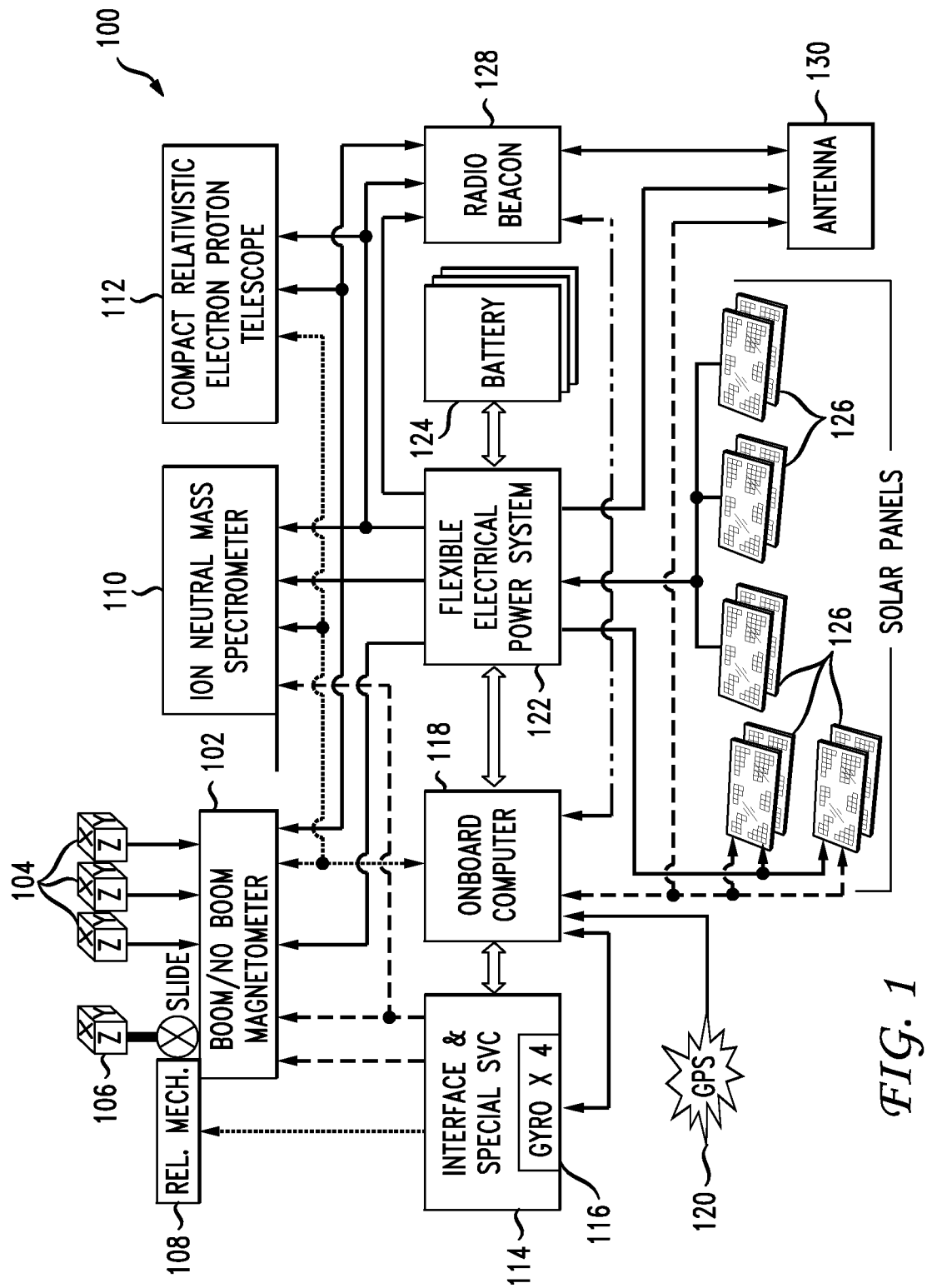
FIG. 1 illustrates an example system 6U system architecture.

A system, method, and computer-readable storage devices are disclosed for enhanced capabilities of a 6U CubeSat. The CubeSat standard provides size and weight guidelines for miniaturized satellites that are simpler to design, build, test, launch, and operate while in orbit. A 1U CubeSat is approximately 10 centimeters cubed. A 6U CubeSat is larger and can provide many of the benefits of a 1U CubeSat while simultaneously enabling larger instrumentation and support infrastructure to be contained therein. For example, a 6U CubeSat is approximately 10 centimeters by 20 centimeters by 30 centimeters. 6U CubeSats offer a solution for reliable, small science-grade missions with inexpensive development. However, the larger area and additional components of a 6U CubeSat can require an enhanced bus and other support structure over a 1U CubeSat. The improved CubeSat disclosed herein can measure ion and neutral composition on an instrument less than 2U in volume, and offers a reduced size by an order of magnitude, and also offers significant reductions in power requirements over the state of the art.

Numerous science instruments, some of which are provided as examples herein, can benefit from added capabilities and size of a 6U CubeSat. The 6U bus disclosed herein enables a greater range of Heliophysics science applications, while focusing on both smaller platforms and constellations of smaller platforms. No other flight-proven 6U bus exists for applications within the Low Cost Access to Space (LCAS) program. Therefore, the 6U CubeSat bus provided and disclosed herein enables a viable and cost-effective 6U platform for small, capable science platforms.

The 6U CubeSat bus described herein can be used to conduct small, yet meaningful, heliophysics scientific missions in a cost-effective way. In one embodiment, the 6U CubeSat bus can support instrumentation that provides measurements of high latitude Field-Aligned Currents (FAC), which are a manifestation of magnetospheric dynamic responses to solar wind disturbances and to energy input in the upper atmosphere. Simultaneous observations of densities and velocities of the ion and neutral constituents will provide the response of the upper atmosphere, while measurements of energetic proton and ion particle fluxes are included to determine the response of the radiation belts.

Because of the uncertainty in the final orbit of such a mission, the science objectives are flexible and adaptable to either a high or low inclination orbit. At high inclination orbits, the 6U CubeSat is well-suited to study the precipitation of radiation belt particles into Earth's upper atmosphere, the auroral circuit, and composition changes in the auroral zone due to coupling with the solar wind. At low inclinations, the 6U CubeSat can focus more on the electrodynamics of low-latitude phenomena. Because of this, the measurement objectives and requirements are determined based on experiences with similar larger instruments that have flown previously.

FIG. 1 illustrates an example system 6U system architecture 100. The 6U CubeSat can integrate numerous components, some of which are off-the-shelf components, into an operational bus system. Some instruments can be integrated to evaluate subsystem functionality. Other example components include science instruments such as a magnetometer 102, an ion/neutral mass spectrometer 110, an energetic particle spectrometer, a gyroscope 116, an onboard compute 118, a battery 124, a compact relativistic electron proton telescope 112, a radio beacon 128, an antenna 130, solar panels 126, a global positioning system transceiver 120, and an interface and special services module 114.

The example magnetometer 102 includes a dual approach to CubeSat magnetometry and can include a total of up to 4 separate fluxgate sensors 104, 106. One miniature in-house fluxgate 106 is extended at the end of a small boom in the typical science magnetometer configuration, and provides the ground truth magnetic field observations. A release mechanism 108 can hold the fluxgate 106 in place or release it as ordered by the onboard computer 118. The other fluxgate sensors 104 are distributed within the bus at different locations in the CubeSat, feeding data to the onboard computer 118 which processes the data via an algorithm to deduce the geophysical signal after removing and/or accounting for noise contributions from the bus. Active comparison of the output from magnetometers 104 with that of the boom magnetometer 106 will demonstrate a more flexible and inexpensive approach to flight magnetometry that would not require a boom. Particle spectrometers can provide in situ observations of ion and neutral densities as well as their composition, and measurements of radiation belt fluxes at low earth orbits.

The fluxgate 106 on the boom can measure the vector magnetic field. The fluxgates 104 not on the boom, or no boom magnetometer (nBM), can measure vector magnetic fields without the use of a boom by using distributed compact sensors within the spacecraft volume and continuously characterizing then subtracting the spacecraft induced error fields, which are normally avoided by placing the magnetometer on a boom. This nBM system will enable science-grade magnetic field measurements without the necessity of flying a boom, which often adds risk and complexity to a mission, and will open the window of adding magnetic field measurements into rides of opportunity.

The compact ion and neutral mass spectrometer (INMS) 110 measures ion and neutral composition and densities. These measurements facilitate the study of the dynamic ionosphere-thermosphere-mesosphere system and coupling to the steady state background atmospheric conditions. INMS 110 will enable new mission measurements, including constellations of CubeSats that would allow us to resolve temporal vs. spatial variations of E and F region dynamics.

The energetic particle spectrometer is the Compact Relativistic Electron Proton Telescope (CREPT) 112. CREPT 112 is a solid-state particle telescope, which characterizes charged particle fluxes with very high time resolution to study radiation belt dynamics. CREPT can monitor relativistic electrons energization and loss in the radiation belts, in particular, electron loss due to microbursts.

Figure 2:
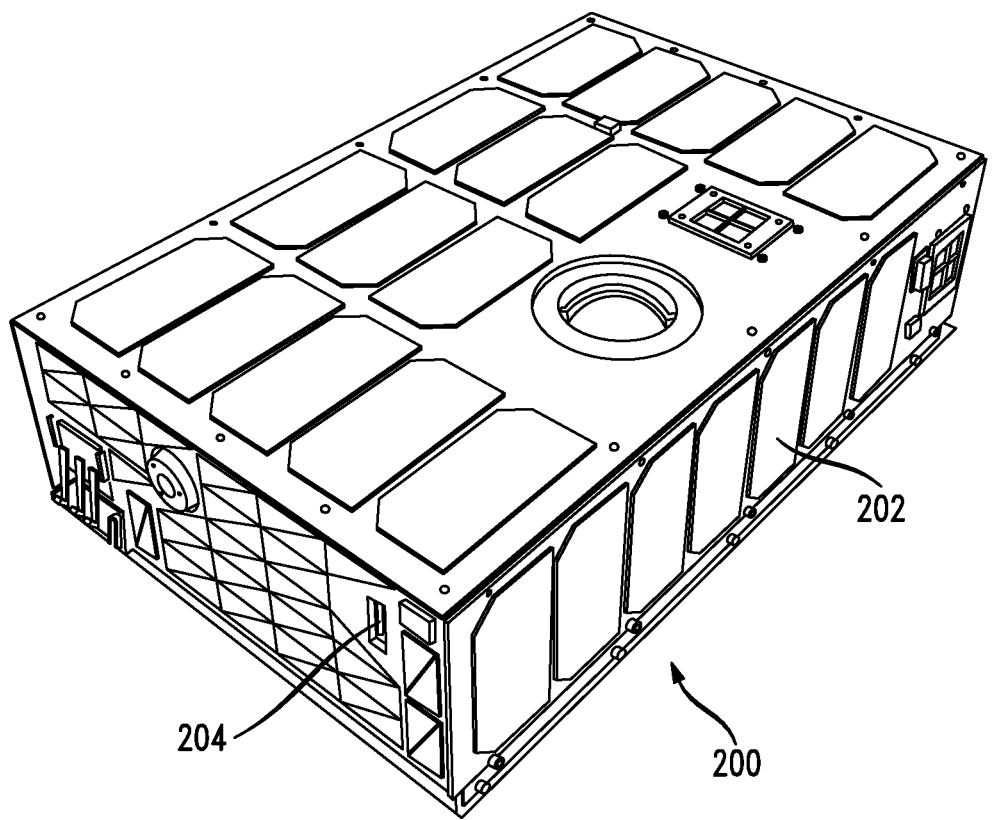
FIG. 2 illustrates the exterior of an example 6U satellite.

FIG. 2 illustrates the exterior 200 of an example 6U CubeSat satellite. Solar panels 202 can cover all or part of the exterior surface, and can be connected to the flexible electrical power system 122 of the CubeSat. The energy supplied via the solar panels 202 can power various components, such as the onboard computer 118 or the radio beacon 128, or can be stored in a battery 124. The exterior 200 of the CubeSat can also include a data port 204 for interfacing with, controlling, writing, and/or reading data from one or more components of the CubeSat.

Figure 3B:
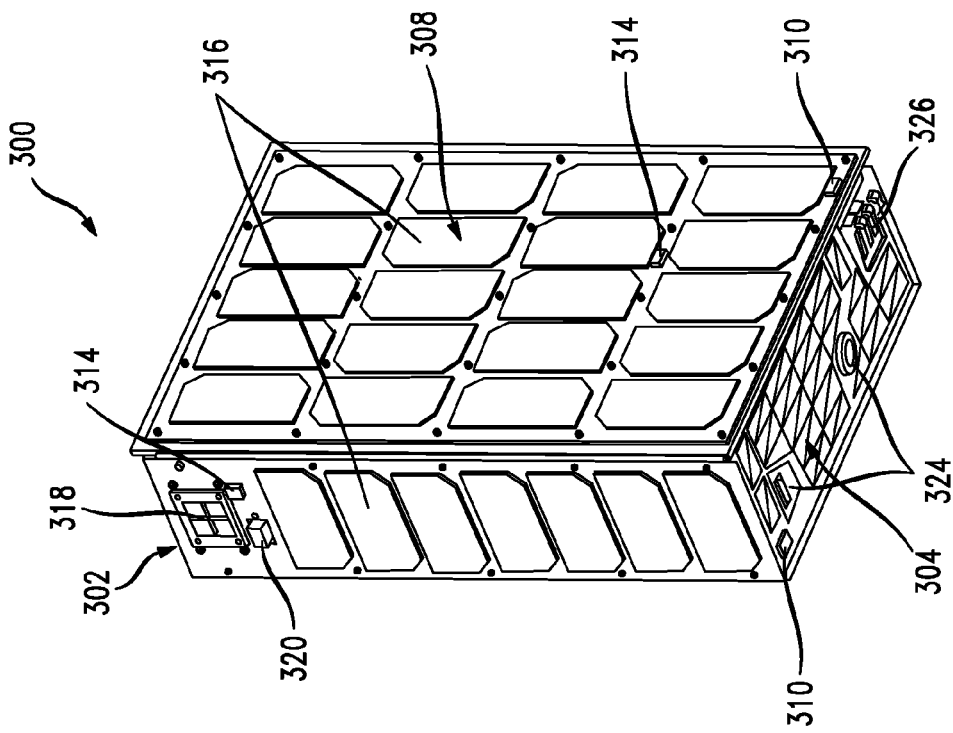
FIGS. 3A and 3B illustrate different angles of the exterior of an example 6U satellite and the various external-facing components.
Figure 3A:
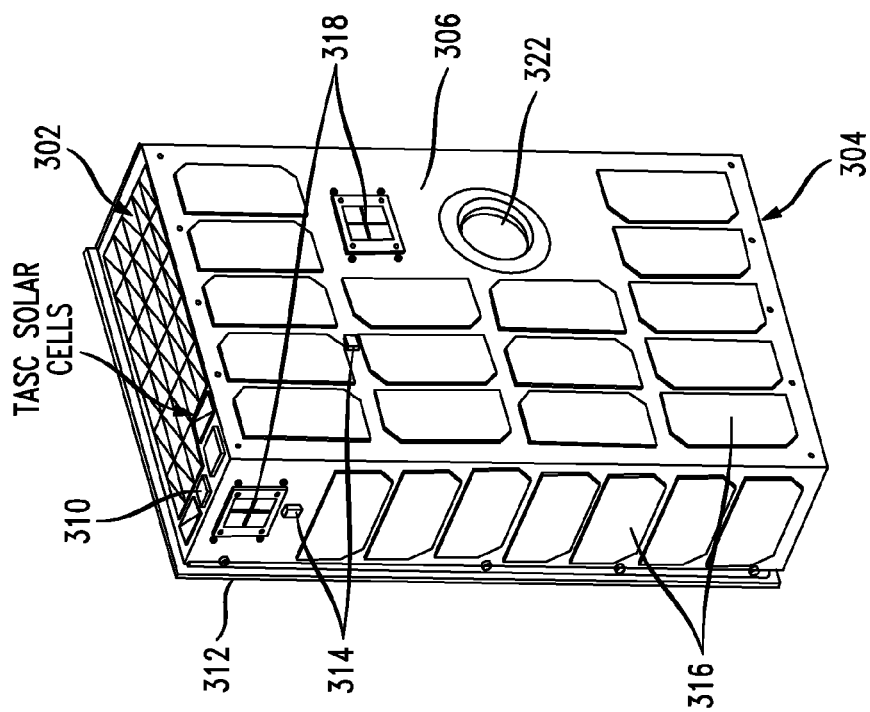

FIGS. 3A and 3B illustrate different angles of the exterior of an example 6U CubeSat satellite and the various external-facing components. FIG. 3A shows the nadir 308, zenith 306, wake 302, and ram 304 of the example 6U CubeSat. FIG. 3B shows the external facing portions of various components, such as a coarse sun sensor 310, base plate 312, temperature sensors 314, solar cells 316, fine sun sensors 318, electrical ground support equipment and equipment to remove before flight 320, compact relativistic electron/proton telescope 322, ion neutral mass spectrometer 324, and separation switches 326.

Figure 4:
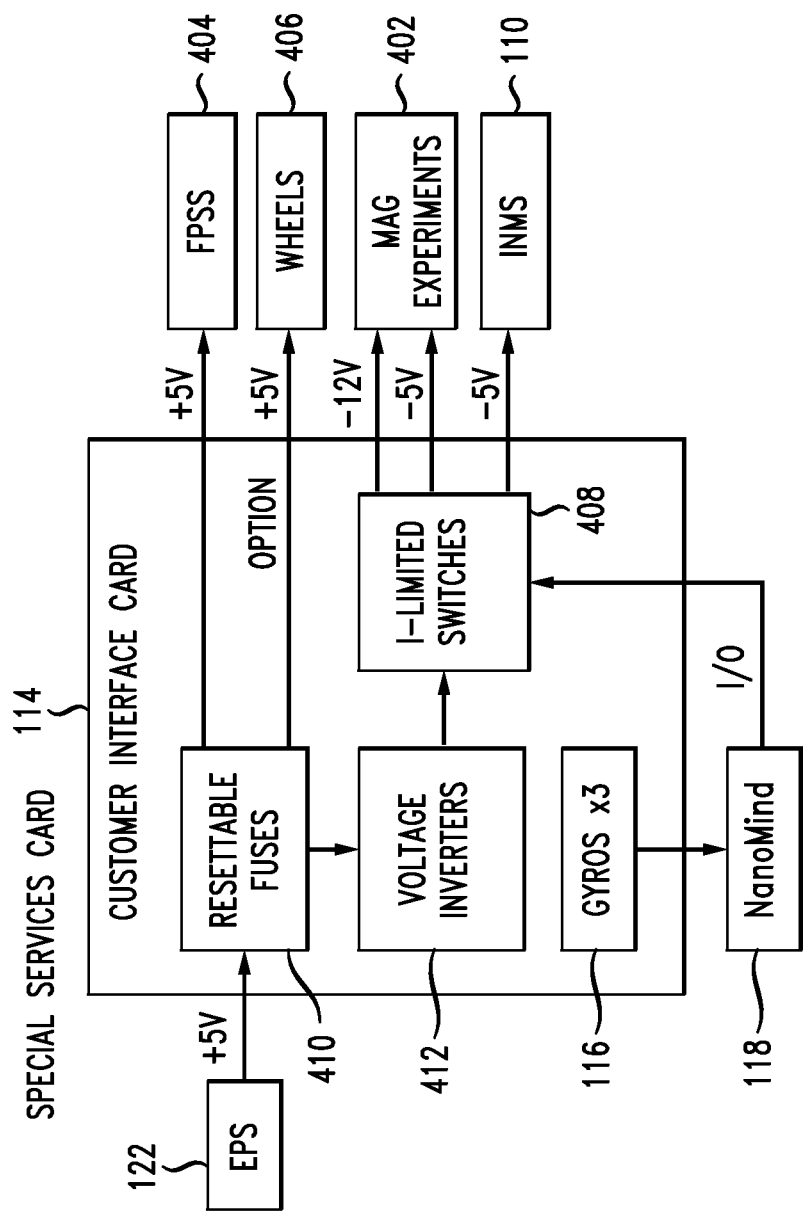
FIG. 4 illustrates a detailed view of the interface and special services card shown in FIG. 1.

FIG. 4 illustrates a detailed view of the interface and special services card 114 as shown in FIG. 1. The interface card 114 can interface with the electrical power system 122, ion neutral mass spectrometer 110, onboard computer 118, and gyroscopes 116 as shown in FIG. 1. The interface card 114 can also interface with or include other components, such as resettable fuses 410, voltage inverters 412, i-limited switches 408, fine pointing sun sensor 414, wheels 406, and magnetic experiments 402.

The special services card 114 is a custom printed circuit board that expands the capability of commercial off the shelf products. Duties include but are not limited to: creating custom voltages, adding power switching capabilities, serving as CubeSat Kit Bus external components interface, current monitoring and extended general purpose input/output lines among others. It also has four off-the-shelf inertial measurement units (IMU) arranged in a square formation to allow for improved sensing accuracy over a single such IMU. The card 114 can have other numbers of IMU's as well. For example, FIG. 4 shows three gyros 116.

Other features of the card 114 can include one or more of an INMS interface, magnetometer support, a reaction wheel interface, a GPS interface with mechanical support for a GPS daughter card, 1pps routed to a CubeSat Kit Bus, unused pins for a spare interface, a cadet transceiver interface, a 3A buck converter and current regulation for use in deployment devices, analog-to-digital converters, and a digital extension interface.

FIG. 5A illustrates the example 6U satellite 504 of FIG. 2 with the magnetometer boom in a non-extended position. The example 6U satellite 504 also depicts the ion neutral mass spectrometer field of view openings 510 in the exterior surface. FIG. 5B illustrates the example 6U satellite 502 of FIG. 2 with the magnetometer boom extended. FIG. 5C illustrates the example 6U satellite 500 of FIG. 2 with the magnetometer boom 506 extended from a different angle, with the magnetometer 508 being positioned at the end of the boom so the boom is at the far-most point away from the 6U satellite 500 during operation. The boom can be extendable and retractable via one or more hinge, motor, spring, elbow joint, and so forth.

Figure 6:
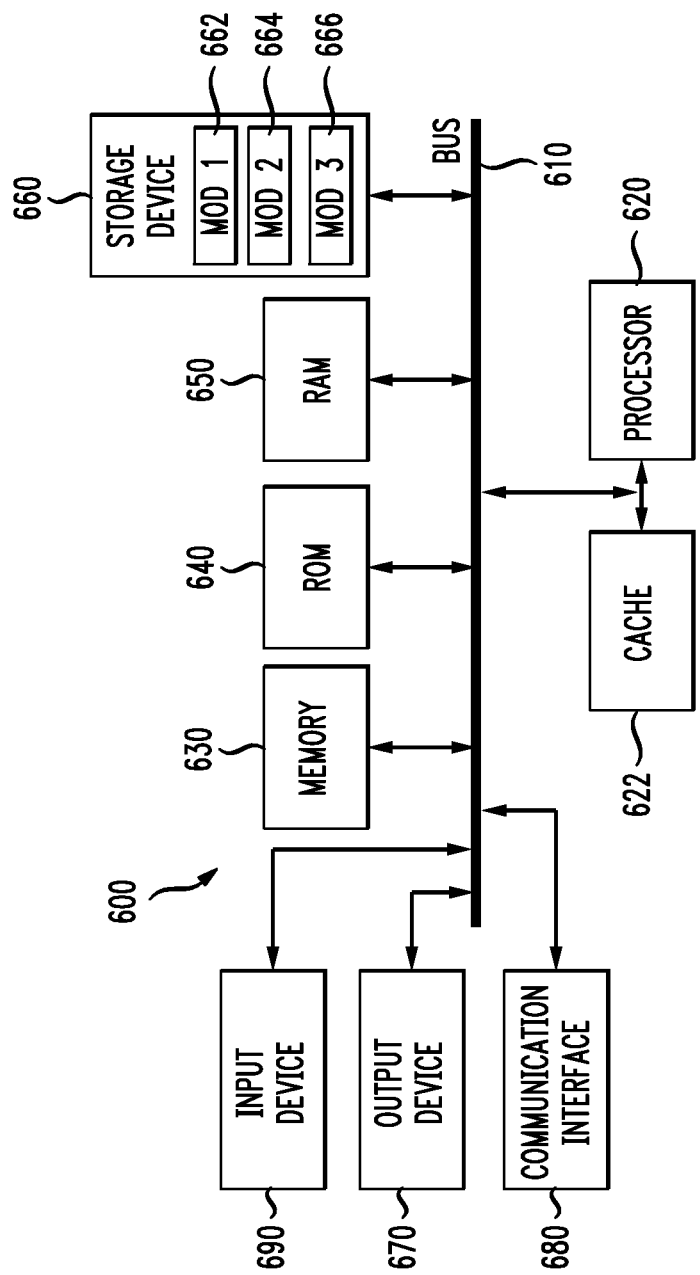
FIG. 6 illustrates an example system embodiment.

Having disclosed some basic system components and concepts, the disclosure now turns to the exemplary method embodiment shown in FIG. 6. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

Various embodiments of the disclosure are described in detail above. While specific implementations are described, it should be understood that this is done for illustration purposes only. Other components and configurations may be used without parting from the spirit and scope of the disclosure. A description of a basic general purpose system or computing device in FIG. 6 which can be employed to practice the concepts, methods, and techniques disclosed is illustrated below. All or part of the general purpose computing device can be included as the onboard computer 118 of FIG. 1.

With reference to FIG. 6, an exemplary system and/or computing device 600 includes a processing unit (CPU or processor) 620 and a system bus 610 that couples various system components including the system memory 630 such as read only memory (ROM) 640 and random access memory (RAM) 650 to the processor 620. The system 600 can include a cache 622 of high-speed memory connected directly with, in close proximity to, or integrated as part of the processor 620. The system 600 copies data from the memory 630 and/or the storage device 660 to the cache 622 for quick access by the processor 620. In this way, the cache provides a performance boost that avoids processor 620 delays while waiting for data. These and other modules can control or be configured to control the processor 620 to perform various operations or actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the processor. The processor 620 may be a self-contained computing system, containing multiple cores or processors, a bus, memory controller, cache, etc. A multi-core processor may be symmetric or asymmetric. The processor 620 can include multiple processors, such as a system having multiple, physically separate processors in different sockets, or a system having multiple processor cores on a single physical chip. Similarly, the processor 620 can include multiple distributed processors located in multiple separate computing devices, but working together such as via a communications network. Multiple processors or processor cores can share resources such as memory 630 or the cache 622, or can operate using independent resources. The processor 620 can include one or more of a state machine, an application specific integrated circuit (ASIC), or a programmable gate array (PGA) including a field PGA.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 660 can include software modules 662, 664, 666 for controlling the processor 620. The system 600 can include other hardware or software modules. The storage device 660 is connected to the system bus 610 by a drive interface. The drives and the associated computer-readable storage devices provide nonvolatile storage of computer-readable instructions, data structures, program modules and other data for the computing device 600. In one aspect, a hardware module that performs a particular function includes the software component stored in a tangible computer-readable storage device in connection with the necessary hardware components, such as the processor 620, bus 610, display 670, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 600 is a small, handheld computing device, a desktop computer, or a computer server. When the processor 620 executes instructions to perform "operations", the processor 620 can perform the operations directly and/or facilitate, direct, or cooperate with another device or component to perform the operations.

Although the exemplary embodiment(s) described herein employs the hard disk 660, other types of computer-readable storage devices which can store data that are accessible by a computer, such as magnetic cassettes, flash memory cards, digital versatile disks (DVDs), cartridges, random access memories (RAMs) 650, read only memory (ROM) 640, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations described below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited tangible computer-readable storage devices. Such logical operations can be implemented as modules configured to control the processor 620 to perform particular functions according to the programming of the module. For example, FIG. 6 illustrates three modules Mod1 662, Mod2 664, and Mod3 666, which are modules configured to control the processor 620. These modules may be stored on the storage device 660 and loaded into RAM 650 or memory 630 at runtime or may be stored in other computer-readable memory locations.

One or more parts of the example computing device 600, up to and including the entire computing device 600, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 620 can include all types of processors disclosed herein, including a virtual processor. However, when referring to a virtual processor, the processor 620 includes the software components associated with executing the virtual processor in a virtualization layer and underlying hardware necessary to execute the virtualization layer. The system 600 can include a physical or virtual processor 620 that receive instructions stored in a computer-readable storage device, which cause the processor 620 to perform certain operations. When referring to a virtual processor 620, the system also includes the underlying physical hardware executing the virtual processor 620.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A satellite, the satellite comprising:
   an on-board computing device connected to an electrical power system, wherein the electrical power system receives power from at least one of a battery and at least one solar panel;
   a first fluxgate sensor attached at a distal end of an extendable boom, wherein the extendable boom is contained within the satellite in a retracted position, and wherein the extendable boom is contained outside the satellite in an extended position;
   a release mechanism for extending the extendable boom;
   at least one second fluxgate sensor fixed within the satellite;
   an ion neutral mass spectrometer; and
   a relativistic electron/proton telescope,
   wherein the on-board computing device is connected to the first fluxgate sensor, the at least one second fluxgate sensor, the ion neutral mass spectrometer, and the relativistic electron/proton telescope via a bus,
   wherein the on-board computing device receives data from the first fluxgate sensor, the at least one second fluxgate sensor, the ion neutral mass spectrometer, and the relativistic electron/proton telescope via the bus, and
   wherein the on-board computing device processes the data via an algorithm to deduce a geophysical signal.

2. The satellite of claim 1, wherein dimensions of the satellite conform to a 6U CubeSat standard.

3. The satellite of claim 2, wherein the dimensions are 10 cm×20 cm×30 cm.

4. The satellite of claim 1, the satellite further comprising:
   an antenna, wherein the on-board computing device transmits an indication of the geophysical signal via the antenna.

5. The satellite of claim 1, wherein the on-board computing device removes noise contributions from the bus while deducing the geophysical signal.

6. The satellite of claim 1, wherein the on-board computing device accounts for noise contributions from the bus while deducing the geophysical signal.

7. The satellite of claim 1, the satellite further comprising:
   a special services card comprising a printed circuit board that expands a capability of commercial products.

8. The satellite of claim 7, wherein the special services card further comprises component configure to perform one or more of operations comprising:
   creating custom voltages; providing power switching capabilities;

serving as an external components interface;
current monitoring; and extending general purpose input/output lines.

9. The satellite of claim 7, wherein the special service card further comprises at least one inertial measurement unit.

10. The satellite of claim 9, wherein the special service card further comprises 4 inertial measurement units configured in a square formation.

\* \* \* \* \*